United States Patent [19]

Okawa et al.

[11] Patent Number: 4,876,373

[45] Date of Patent: Oct. 24, 1989

[54] METHOD OF MANUFACTURING ORGANOPOLYSILOXANE HAVING TERMINAL ALKENYL GROUPS

[75] Inventors: Tadashi Okawa; Toshio Suzuki, both of Chiba, Japan

[73] Assignee: Toray Silicone Company, Ltd., Tokyo, Japan

[21] Appl. No.: 242,237

[22] Filed: Aug. 31, 1988

[30] Foreign Application Priority Data

Aug. 31, 1987 [JP] Japan .................................. 62-217293
Apr. 28, 1988 [JP] Japan .................................. 63-107345

[51] Int. Cl.$^4$ .............................................. C07F 7/08
[52] U.S. Cl. .................................................. 556/453
[58] Field of Search ......................................... 556/453

[56] References Cited

U.S. PATENT DOCUMENTS 3,146,251  8/1964  Brown et al. .................... 556/453 X
4,611,042  9/1986  Rivers-Farrell et al. ......... 556/453 X
4,792,596 12/1988  Otilinger et al. ................ 556/453 X

FOREIGN PATENT DOCUMENTS 3436164  4/1986  Fed. Rep. of Germany ...... 556/453
  78236  of 1984  Japan ................................... 556/453

Primary Examiner—Paul F. Shaver
Attorney, Agent, or Firm—Roger H. Borrousch

[57] ABSTRACT

Polymerizing cyclic trisiloxanes using as the polymerization initiator an alkali metal salt of an organosilane or organopolysiloxane having a terminal alkenyl group, followed by termination of the reaction, produces an organopolysiloxane having an alkenyl group on one end. These organopolysiloxanes are useful for making copolymers and as additives to siloxane elastomers.

7 Claims, No Drawings

METHOD OF MANUFACTURING ORGANOPOLYSILOXANE HAVING TERMINAL ALKENYL GROUPS

BACKGROUND OF THE INVENTION

Areas of Application in Industry

The present invention concerns a method of manufacturing an organopolysiloxane containing terminal alkenyl groups. In detail, it concerns a method of manufacturing an organopolysiloxane manufactured by means of non-equilibrium polymerization and at least having an alkenyl group at one end and some specific group at the other end of the molecule.

Conventional Technology

The ring-opening polymerization of cyclic trisiloxane using an alkali metal cataylst is known in the art as an industrial technology. Also known in the art is what is termed living polymerization, which yields non-equilibrium polymerization. For example, in *Macromolecules* Vol. 3 No. 1 (1970), page 1, J. Saam et at. noted that, following ring-opening polymerization of hexamethyl cyclotrisiloxane using butyl lithium, the addition of vinyl chlorosilane caused polymerization to cease. This resulted in the production of an organopolysiloxane having a terminal vinyl group at one end of the molecule. Japanese Laid-open Patent No. 59-78,236 published May 7, 1984 presents a similar method for the manufacture of organopolysiloxane. This method of introducing a functional group by means of a polymerizationterminating agent containing that functional group is generally called a "termination method."

Problems of Conventional Technology

With this type of conventional technology, chain termination at the end of the molecule is carried out when the polymer is formed. There is thus no guarantee that the reaction which introduces this functional group is completed. This is a disadvantage. A second disadvantage is that, if a functional group is not introduced at the terminal end (that is to say, at the head) of the molecule at the time of polymerization initiation, then only monofunctional organopolysiloxane will be obtained. This is also a disadvantage.

SUMMARY OF THE INVENTION

Purpose of the Invention

The inventors of the present invention undertook extensive investigations with the objective of remedying the defects in this sort of termination method. These investigations resulted in the present invention. To summarize, the objective of the present invention is to provide a method of manufacturing organopolysiloxane with alkenyl groups at least reliably introduced at the terminal end (that is to say, at the head) of the molecule during polymerization initiation by means of non-equilibrium polymerization.

The objective of the abovementioned present invention is to provide a method of manufacturing organopolysiloxane having terminal alkenyl groups as represented by the formula

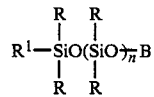

and characterized by the fact that the reaction is terminated after the polymerization of cyclic trisiloxane in accordance with the formula

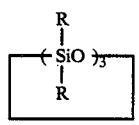

wherein the polymerization initiator is an alkali metal salt of an organosilane or organopolysiloxane as represented by the formula

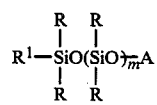

and the reaction is carried out in the presence or absence of a molecular weight regulator which is an organosilane or organopolysiloxane as represented by the formula

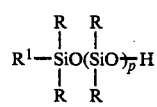

wherein
$R^1$ represents an alkenyl group, R represents a single-charge hydrocarbon group or single-charge halogenated hydrocarbon group of the same or different type. A represents an alkali metal, m represents 0 or an integer of 1 or above, p and m represent 0 or the same or different integers of 1 or above, B represents a hydrogen atom or a single-charge group selected from among terminal ending groups, and n meets the conditions of $n \geq m+3$, and where the molar ratio of the polymer initiator and the molecular weight regulator are in a range of 100:0–0.1:100.

DESCRIPTION OF THE PREFERRED EMBODIMENTS

In greater detail, the organosilane or organosiloxane alkali salt used as the polymerization initiating agent is characterized by the fact that it contains an alkenyl group bonded to the silicon atom at the terminal end of the molecule, and an alkali metal substituted for a hydrogen atom in the hydroxyl group bonded to the opposite terminal end (or, in organosilane, the same silicon atom). Methods of manufacturing this alkali salt of organosilane or organopolysiloxane are known in the art. For example, monochlorosilane or polysiloxane containing alkenyl groups corresponding to those described above can be carefully hydrolyzed with a dilute alkaline aqueous solution, to yield an organosilane or organopolysiloxane which simultaneously contains alkenyl groups and silanol groups. This is then reacted with an alkali metal compound to yield the corresponding alkali metal salt. The alkali metal compounds represented by A include lithium, sodium, and potassium. However, lithium is preferred, just as with usual organopolysiloxane non-equilibrium polymerization. When the silanol group becomes a lithium salt, the reaction is usually with alkyl lithium. However, the use of n-butyl lithium is preferred for the present invention.

Normally, ethylene double bonds tend toward polymerization under the influence of an alkali catalyst. However, the present invention employs a specially structured organosilane or organopolysiloxane as the polymerization initiator, so that the terminal alkenyl group of the organopolysiloxane remains stable throughout the entire manufacturing process.

Due to factors related to ease of raw material acquisition and manufacture, raw materials with alkenyl groups $R^1$ having a carbon number of 2 to 10 are preferred, with a carbon number of 2 to 6 are more preferred. These alkenyl groups can include vinyl groups, butenyl groups, hexenyl groups, and decenyl groups. There are no particular limitations on the position of the double bond within the alkenyl group, but with regard to the reactivity of the resulting polymer, it is best if the double bond is at the end of the alkenyl group. R represents single-charge hydrocarbon groups or halogenated hydrocarbon groups of the same or different types. For ease of manufacturing, it is best if all or most of these groups are methyl groups. Examples of bonding groups other than methyl groups include such alkyl groups as ethyl groups, propyl groups, butyl groups, pentyl groups and hexyl groups, such aryl groups as phenyl groups, tolyl groups and xylyl groups, such aralkyl groups as benzyl groups and phenetyl groups, and halogenated alkyl groups such as chloromethyl groups, chloropropyl groups and trifluoropropyl groups. If introduction of an alkenyl group within the molecular chain is desired, then R can also be an alkenyl group.

Values for m have been established as 0 or an integer of 1 or above. However, when m=0, the stability of the organosilane precursor is poor, and the hydroxyl groups are unfortunately quite prone to dehydrogenation condensation. Because organopolysiloxane precursors containing silanol groups are stable with regard to dehydrogenation, and also because of considerations of ease of manufacture, organopolysiloxanes in which m=3 to 20 are preferred.

The cyclic trisiloxane used in the present invention is known in the art as a monomer for use in non-equilibrium polymerization. The substituted group R, which is bonded to the silicon atom, is a single-charge hydrocarbon group or single-charge halogenated hydrocarbon group of the same type or a different type as that described above. If introduction of an alkenyl group into the molecular chain is desirable, then R can be an alkenyl group. Factors concerning ease of acquisition dictate that methyl groups or phenyl groups are practical choices for the substituted group R bonded to the silicon atom in the cyclic trisiloxane.

Conditions for the polymerization reaction vary depending on the monomer used. For example, when polymerizing hexamethyl cyclotrisiloxane, the reaction should be carried out for 1 to 50 hours in a solvent medium at 0° to 30° C. The solvent medium should be a non-protonating substance in which both the starting materials and the product polymer are readily soluble. Examples of solvent media include aromatic hydrocarbons such as benzene, toluene and xylene, aliphatic hydrocarbons such as hexane and heptane, ethers such as tetrahydrofuran and diethyl ether, ketones such as acetone and methylethyl ketone, esters such as ethyl acetate and butyl acetate, and such other substances as dimethyl formaldehyde, dimethyl sulfoxide, and hexamethyl phosphoric triamide. Good results are also frequently obtained using a mixture of 2 or more solvents. For example, when using a solvent with low polarity, such as toluene, the reaction can be accelerated by the addition of a high-polarity solvent such as dimethyl formaldehyde, dimethyl sulfoxide, or hexamethyl phosphoric triamide.

Of the reaction conditions, it is particularly important to carefully regulate reaction temperature and time so that repartition reactions do not occur. Particular care is required when manufacturing an organopolysiloxane having an alkenyl group at only one end of the molecular chain. This is because, if the polymerization reaction changes from non-equilibrium polymerization to an equilibrium reaction with repartition, then it will no longer be possible to maintain the alkenyl group at only one end. In other words, polymers having alkenyl groups at both ends and other polymers having alkenyl groups at neither end will be produced as side products.

It is usually best to monitor the polymerization reaction by means of gas chromatography or the like to detect residual amounts of original monomer, and to terminate the reaction by means of a neutralizing operation when the reaction rate has reached a specific level. The reaction rate percentage at which the reaction should be terminated varies widely, depending on the original monomer and the target polymer, but normally falls within a range of 70 to 100%, and preferably 80 to 95%.

Before the reaction, it is necessary to reduce the water content of the solvent and the original monomer as much as possible. Water content will cause a reduction in the molecular weight of the resulting organopolysiloxane, and make it impossible to obtain the target organopolysiloxane having terminal alkenyl groups. Recommended methods for drying the solvent and monomer include distillation, heating, bubbling with drying gas, adsorption onto active alumina, silica gel, or zeolite, and dehydrogenation by an alkali metal or alkali metal compound.

Under the manufacturing method of the present invention, the molecular weight of the resulting organopolysiloxane is determined by the ratio of the polymerization initiator and the cyclic trisiloxane which is consumed in the polymerization process. The substitution reaction between the silanol group and alkali metal silanolate occurs at very high speed. It is thus acceptable to add, as a molecular weight regulator, an organosilane or organopolysiloxane containing silanol groups which are the raw material of the polymerization initiator alkali metal silanolate.

When the polymerization initiator is being produced, this molecular weight regulator causes a reaction to occur with the mole number of the alkali metal compound being lower than the mole number of silanol groups. Any combination of polymerization initiator and organosilane or organopolysiloxane having unreacted silanol groups can be used. Raw material for the polymerization initiator may also be newly added, and made up of an unrelated organosilane or organopolysiloxane with terminal alkenyl groups. There is no particular limitation on the degree of polymerization p of this molecular weight regulator, which can be the same as or different from m, as long as it is 0 or an integer of 1 or above. Preferably, however, this value will be 3 to 20, just as for m.

The quantity of alkali metal silanolate should be sufficient to produce the ring-opening reaction, with this quantity such that the mole ratio of the polymerization initiator (alkali metal) and the molecular weight regulator (silanol) is 100:0 to 0.1:100. If this ratio falls in the range 0.5:99.5 to 50:50, then a desirable polymerization speed can be attained. This is preferred with regard to production efficiency, and also conserves expensive catalyst.

The neutralizing agent used to terminate the reaction can be any material which reacts with alkali metal silanolate to form a stable alkali metal salt. Examples include hydrated carbonic acid gas, such mineral acids as hydrochloric acid and sulfuric acid, such carboxylic acids as acetic acid, propionic acid and acrylic acid, and such chlorosilanes as trimethyl chlorosilane, dimethyl chlorosilane, dimethylphenyl chlorosilane and dimethylvinyl chlorosilane. When polymerization is terminated with hydrated carbonic acid gas, mineral acid or carboxylic acid, the polymer terminating group will be a silanol group. If terminated with chlorosilane, the terminal ending group will be a silyl group from chlorosilane with the chlorine atom removed. In other words, acid should be used for termination when it is desirable to produce an organopolysiloxane with a silanol group introduced at the end of the molecule opposite to the alkenyl group. When a functional group bonded to a silicon atom is to be introduced, chlorosilane containing that functional group should be used for termination. A variety of chlorosilanes can also be added to a silanol-terminated organopolysiloxane which was previously obtained by means of acid termination, and various functional groups can be introduced by hydrochloric acid removal reaction. At this juncture, use of a hydrochloric acid supplement such as an amine is recommended. A variety of functional groups can also be introduced through reactions with silanol-group terminating organopolysiloxanes and silazanes, aminosilanes, silyl amides, or alkoxy silanes. The organopolysiloxanes obtained in this way have an n value of at least 3, an alkenyl group at one end of the molecule, and at B, on the other end, a hydrogen atom or a silyl group bonded to an alkyl group, aryl group, alkenyl group, alkynyl group or hydrogen atom.

An organopolysiloxane containing a terminal alkenyl group and produced by means of the present invention can be used in, for example, the reaction in the presence of platinum catalyst of methylhydrogen polysiloxane chain-terminated at both ends by trimethylsiloxy groups to yield a graft copolymer of organopolysiloxane. In addition, the reactivity of the alkenyl group makes it possible to easily obtain a copolymer with a polymer other than organopolysiloxane.

PRACTICAL EXAMPLES

Below, the present invention will be described with reference to practical examples of its implementation. In the examples, "Me" represents a methyl group, "Vi" a vinyl group, and "Hex" a $Vi(CH_2)_4$—. Unless noted, characteristic values are for measurements carried out at 25° C. Insofar as possible, water was removed from the solvents and reagents before use.

PRACTICAL EXAMPLE 1

Samples of 200 g water, 200 g ice, 80 g diethyl ether, and 13 g sodium hydrogencarbonate were added to 4 flasks with mixers attached. While the mixtures were being thoroughly mixed, a mixture of 40 g of $Me_2$-ViSi(OSiMe$_2$)$_3$Cl and 35 g diethyl ether was dripped in. After separation of the liquids, anhydrous sodium sulfate was added to dry the ether layer, and then the ether was removed by distillation to yield $Me_2ViSi(OSiMe_2)_3OH$. This was termed OH-1.

Into 4 flasks equipped with mixers were placed 4.97 g of OH-1, 40 ml of tetrahydrofuran and 10 ml of 1.53N hexane solution of n-butyl lithium. This was mixed to yield a lithium salt of OH-1, $Me_2ViSi(OSiMe_2)_3OLi$, which was termed OLI-1 (0.31 mol/liter). Into 4 mixer-equipped flasks were placed samples of 0.60 ml (0.186 mmol) OLI-1, 6.43 g (19.8 mmol) OH-1, 75 g hexamethyl cyclotrisiloxane, 75 g toluene and 1.5 g dimethyl sulfoxide. This mixture was reacted under a nitrogen atmosphere at room temperature for 5 hours. At this point gas chromatography indicated that a reaction rate of 80% had been reached, so the reaction was neutralized with dry ice. After filtration, reduced pressure distillation was used to remove the solvent and unreacted raw materials. The resulting polymer was termed VP-1. Gel permeation chromatography (GPC), Fourier transformation nuclear magnetic resonance (FTNMR), and iodometric quantification of the vinyl group were all used to confirm that VP-1 was an organopolysiloxane expressed by the following Mean Formula.

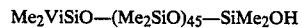

$Me_2ViSiO$—$(Me_2SiO)_{45}$—$SiMe_2OH$

Molecular weight distribution dispersion (Mw/Mn) by GPC was 1.19 for the polymer.

PRACTICAL EXAMPLE 2

Into 4 mixer-equipped flasks were placed samples of 6.1 ml (5 mmol) of OLI-1 from Practical Example 1, 41.6 g hexamethyl cyclotrisiloxane and 41.6 g tetrahydrofuran. This mixture was reacted under an argon atmosphere for 3.5 hours at room temperature. At this point gas chromatography indicated a reaction rate of 89%, so 0.71 g (7.5 mmol) of dimethyl chlorosilane was added and mixed in to neutralize the reaction. After filtration, the solvent and unreacted materials were removed by reduced pressure distillation. The resulting polymer was termed VP-2. GPC and FTNMR analysis indicated that this VP-2 was an organopolysiloxane represented by the following Mean Formula.

$ME_2ViSiO$—$(Me_2SiO)_{98}$—$SiMe_2H$

PRACTICAL EXAMPLE 3

$Me_2HexSi(OSiMe_2)_3OH$ was synthesized in the same way as OH-1 of Practical Example 1, and was termed OH-2. Next, using the same methods as for Practical Example 1, OH-2 and n-butyl lithium were reacted to yield a solution of the OH-2 lithium salt termed OLI-2 (0.28 mol/liter).

Into 4 mixer-equipped flasks was placed 23.9 ml (6.7 mmol) OLI-2, 70 g hexamethyl cyclotrisiloxane, 70 g toluene and 2.5 g dimethyl sulfoxide. These materials were mixed for 24 hours at 10° C. At this point gas chromatography indicated a reaction rate of 85%, so the mixture was neutralized with 0.6 g (10 mmol) of acetic acid. After filtration, the solvent and unreacted materials were removed by reduced pressure distillation. The resulting polymer was termed HP-1. Analysis using GPC, FTNMR and iodometry indicated that this HP-1 was the following organopolysiloxane.

Me$_2$HexSiO—(Me$_2$SiO)$_{126}$—SiMe$_2$OH

Into 4 mixer-equipped flasks were placed 50 g (5.22 mmol) HP-1, 1.26 g (10.4 mmol) dimethylvinyl chlorosilane, 2.22 g (22 mmol) triethylamine, 50 g toluene, and 40 g tetrahydrofuran. This mixture was reacted at room temperature for 24 hours. After filtration, the solvent and unreacted materials were removed using reduced pressure distillation, yielding a polymer. This polymer was termed HP-2. Analysis by GPC, FTNMR and iodometry confirmed that this HP-2 was the following organopolysiloxane.

Me$_2$HexSiO—(Me$_2$SiO)$_{127}$—SiMe$_2$Vi

PRACTICAL EXAMPLE 4

Samples of 3.5 g (10.8 mmol) of OH-1 from Practical Example 1 were placed in 4 mixer-equipped flasks, and 1.3 ml (2.1 mmol) of 1.62N hexane solution of n-butyl lithium was added under a nitrogen atmosphere. Mixing was carried out, yielding a mixture in which 20 mol% of all lithium groups in the OH-1 were lithium-ized. To this was added 30 g hexamethyl cyclotrisiloxane, 30 g toluene, and 0.6 g dimethyl sulfonate. This mixture was reacted under a nitrogen atmosphere at room temperature for 3.5 hours, at which point gas chromatography indicated a reaction rate of 80%. Then 0.15 g (2.5 mmol) acetic acid was added and mixed in to neutralize the mixture. After filtration, the solvent and unreacted materials were removed by reduced pressure distillation. The resulting polymer was termed VP-3. Analysis by GPC and FTNMR confirmed that this VP-3 was an organopolysiloxane represented by the formula below.

Me$_2$ViSiO—(Me$_2$SiO)$_{33}$—SiMe$_2$OH

EFFECTS OF THE INVENTION

The organopolysiloxane manufacturing method of the present invention makes it possible to easily obtain organopolysiloxane having at least an alkenyl group on one end of the molecular chain, and a specific group on the other end. The organopolysiloxane thus obtained can be used as a raw material for silicone rubber or raw material for a new graft organopolysiloxane, or for copolymerization with plastics and resins other than organopolysiloxanes. It will thus prove to be of great value in areas of chemical technology.

That which is claimed:

1. A method of manufacturing a organopolysiloxane having terminal alkenyl groups as represented by the formula

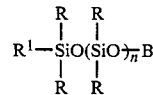

comprising polymerizing a cyclic trisiloxane with the formula

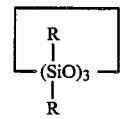

using as a polymerization initiator an alkali metal salt of an organosilane or organopolysiloxane as represented by the formula

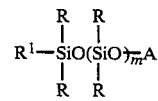

in the presence or absence of a molecular weight regulator which is an organosilane or organopolysiloxane as represented by the formula

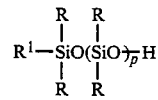

and then terminating the reaction,
wherein $R^1$ represents an alkenyl group, R represents a single-charge hydrocarbon group or single-charge halogenated hydrocarbon group of the same or different types, A represents an alkali metal, m is 0 or an integer of 1 or above, p is 0 or an integer of 1 or above and may be equal to or different from the value of m, B represents a hydrogen atom or a single-charge group selected from among terminal ending groups, and n meets the conditions of n>m+3, and the molar ratio of the polymer initiator and the molecular weight regulator are in a range of 100:0 to 0.1:100.

2. The manufacturing method in accordance with claim 1 wherein $R^1$ is an alkenyl group containing 2 to 6 carbon atoms.

3. The manufacturing method in accordance with claim 1 wherein R is methyl.

4. The manufacturing method in accordance with claim 1 wherein m is 3 to 20.

5. The manufacturing method in accordance with claim 1 where the alkali metal is lithium.

6. The manufacturing method in accordance with claim 1 wherein the reaction is terminated using inorganic acid, organic acid, or organochlorosilane.

7. The manufacturing method in accordance with claim 6 wherein the organopolysiloxane terminated by a silanol group through the action of inorganic or organic acid is further terminated by organochlorosilane.

* * * * *